United States Patent [19]

Kihlberg et al.

[11] Patent Number: 5,270,646

[45] Date of Patent: Dec. 14, 1993

[54] METHOD AND APPARATUS FOR DETERMINIG POSITION AND WIDTH OF METALLIC MATERIAL USING A PULSED ELECTROMAGNETIC TECHNIQUE

[75] Inventors: Erik Kihlberg, Västerås; Sten Linder, Trosa; Lennart Thegel, Västerås, all of Sweden

[73] Assignee: Asea Brown Boveri AB

[21] Appl. No.: 875,465

[22] Filed: Apr. 29, 1992

[30] Foreign Application Priority Data

May 2, 1991 [SE] Sweden .................... 9101315-1

[51] Int. Cl.$^5$ ................ G01B 7/14; G01N 27/72; G01R 33/00
[52] U.S. Cl. ................ 324/207.16; 324/207.12; 324/225; 324/243; 324/227
[58] Field of Search ............ 324/207.12, 207.13, 324/207.16, 207.22, 207.23, 225, 242, 243, 209, 227

[56] References Cited

U.S. PATENT DOCUMENTS 3,600,672 8/1971 Kubo et al. ................ 324/209

OTHER PUBLICATIONS

Iron and Steel Engineer; May 1989; Cold Strip Measurement and Inspection; p. 25, Harding & Ricciatti.

Primary Examiner—Walter E. Snow
Attorney, Agent, or Firm—Watson, Cole Grindle & Watson

[57] ABSTRACT

Edge position determination of metallic materials by means of evaluation of the voltages which are induced in coils located at the edges of the material below the material and partially covered by the material as well as coils located inside of the first-mentioned coils in the transverse direction of the material, which latter coils are completely covered by the material in connection with a decaying magnetic field which is generated by the same coils.

17 Claims, 3 Drawing Sheets

METHOD AND APPARATUS FOR DETERMINIG POSITION AND WIDTH OF METALLIC MATERIAL USING A PULSED ELECTROMAGNETIC TECHNIQUE

TECHNICAL FIELD

In the rolling of metallic materials, it is often desired, for reasons of process technique, to center the rolled material in the roll track. One of the conditions for doing so is that the width of the material or the edges thereof are available. The present invention relates to a method for edge position measurement and to an edge position measuring device which can be used for determining edge position, centre position and width for all types of metallic materials.

BACKGROUND ART, THE PROBLEMS

One known method of determining edge position and material width of a rolled material is described, inter alia, in Iron and Steel Engineer, May 1989, pp. 23-25, in an article entitled "Cold strip measurement and inspection". The method comprises using two or more video cameras directed against the rolled material. The video cameras are positioned on one and the same line across the material in such a way that the two edges are covered by the field of view of the respective outer cameras. To obtain sufficient contrasts between material and the external surroundings, either that side of the strip which faces the cameras or the under side of the material is illuminated by one or more light sources. The "image", perceived by the video cameras, of the region around the edges of the material is data processed in a known manner using conventional, modern technique such that, after calibration of the equipment, the positions of the edges can be indicated. Position data can then both be shown on a monitor and be included as measured values in an edge position or centering control device.

The environment in which the edge position measuring devices are situated may give rise to considerable problems for optical measuring methods. Keeping camera lenses and light sources free from dust and dirt often assume daily cleaning. In addition, these applications often involve high temperatures in the surroundings as well as splashing from water flushing, which may jeopardize the function of the measuring system.

Before the video technique became generally available, other measuring methods (without describing these in more detail) were available which were based on optomechanical systems as well as on sensors making direct contact with the edges of the material.

In Trosa Metaltronica AB's pamphlet S87-01, an electromagnetic method for edge position determination is described. The method comprises placing a coil under the two edges of the material. Special evaluation technique analyzes the voltage induced in the coil after a magnetizing current in the coil has been disconnected. In this way, under certain special conditions, a measure of the edge position can be obtained.

The evaluation technique used is described in SE 451 886 entitled "Method and device for contactless measurement of quantities in or near electrically conducting material". A magnetizing field is generated with the aid of a coil which can be supplied with alternating current or a pulsed polarized or unidirectional direct current. The quantities, about which information may be obtained by evaluation of the aperiodic induced voltage signal which arises in connection with the decaying magnetic field, are the distance between the coil and the electrically conducting material, the thickness of the material, and its electrical conductivity. The various quantities may be determined substantially by sampled measurement, i.e. by dividing the measurement of the induced voltage into different time intervals. The distance between the coil and the electrically conducting material is determined substantially by the magnitude of the induced voltage in a time interval immediately after switching off the magnetic field.

The voltage induced in the coils in case of a decaying magnetic field, when the coils according to the above pamphlet are placed under the material edges, will be dependent on how large a part of the coils is covered by the material. Besides this dependence, also the signal will to a very great extent be dependent on the distance between the coil and the material, as well as on a possible edge bending of the rolled material. This is one of the reasons why edge position gauges designed in this way, with edge measuring coils only, have not become more widely spread.

SUMMARY OF THE INVENTION, ADVANTAGES

A method for edge position measurement and an edge position measuring device according to the invention are based on the electromagnetic measuring principle described above. Thus, it is assumed that an edge measuring coil is positioned under both edges of the material in such a way that the coils for the width variation of the relevant material are more or less covered by the material. The edge measuring coils are wound and directed such that, upon magnetization, the magnetic field lines emanating from the centre of the edge measuring coils are directed substantially perpendicular to the material. The voltage induced in the coils in case of decaying magnetic field will thus become dependent on the degree of coverage.

Immediately inside the edge measuring coils in the transverse direction of the material and on the same plane as the edge measuring coils, a coil is placed on each side, and this coil will thus always be covered by the material. The technique described in the above patent for measuring the distance between a coil and an electrically conducting material may therefore be directly applied. By measurement and evaluation of the voltage which is induced in the coil, hereinafter referred to as the height measuring coil, in case of a decaying magnetic field from the height measuring coil, the distance of the material to the coil can thus be determined.

As mentioned above, the voltage which is induced in the edge measuring coil, besides being dependent on the degree of coverage, will also be greatly dependent on the distance between the coil and the material. By calibration and determination of this relationship, that is, the influence on the induced voltage for varying degrees of coverage for different distances, a possibility of compensation of the distance dependence is given. Normally, the distance between the edge measuring coil and the material, apart from possible edge flutter, is the same as the distance between the height measuring coil and the material. Therefore, the evaluated part of the voltage induced in the height measuring coil, which serves as distance determination to the material, can be used for correction of the voltage induced in the edge measuring coil.

In certain rolling applications, however, so-called edge bending may be obtained. This means that the distance between a height measuring coil and the material postioned above it is not the same as the distance between the edge measuring coil and the edge of the material. The correction which is to take place of the signal of the edge measuring coil with regard to the distance will therefore not be correct. However, this drawback can be largely eliminated by arranging an additional height measuring coil inside in the transverse direction of the strip and in the same plane as the first-mentioned height measuring coil. In this way, the change of height or the inclination of the strip may be determined, and with knowledge of the approximate distance from the height measuring coils and out to the edge of the material, a distance, compensated for edge bending, may form the basis for distance correction.

To further reduce the influence of distance variations and edge flutter, it has proved to be suitable, with the aid of at least the height measuring coil nearest the edge measuring coil, to generate a field which is simultaneous with the field from the edge measuring coil. One way of achieving this is to allow height measurement and edge measurement to take place synchronously. This will impart to the height measuring coils, in addition to their measuring function, also a function as generator of supporting fields to the edge measuring coil. As a result of this arrangement, the distance dependence is considerably reduced.

The edge and height measuring coils are suitably located on a common beam which is arranged perpendicular to the rolling direction. The signals of the height measuring coil can also be used to check that the beam is mounted in parallel with the rolled material.

To increase the resolving power and hence the accuracy of the measured signals, the invention comprises connecting so-called reference coils to both the edge measuring coils and the height measuring coils, these reference coils being placed so as not to be influenced by the material. To bring about the magnetizing field, the reference coils are connected in parallel with the edge and the height measuring coils, respectively. On the other hand, the measurement signals from each edge measuring coil and its reference coil are each conected to an input on a differential amplifier, thus obtaining the difference voltage. The same principle of connection is used also for the height measuring coils.

The signal which is obtained from the edge measuring coils, in addition to its great distance dependence, also has a certain material dependence, for it has proved that the signal is influenced to a certain extent by the thickness of the material as well as its conductivity and magnetic permeability. Both of these quantities, of course, may be extracted from the signal which is obtained from the height measuring coils in accordance with the technique which is described in connection with the above-mentioned patent. This means that the edge signal can be corrected also as regards this material dependence. Generally, however, a direct knowledge of the properties and thickness of the material in question is also available, which entails a possibility of entering these data into the measuring system for correction of the edge signal.

To attain a large width measuring range while retaining a high measurement resolution, it has proved to be suitable to allow an edge measuring unit to consist of a relatively large number of coils in a row, and to allow all the coils included in the unit to have the same number of turns and the same geometrical shape. In this way the equipment can cover a large width range of the rolled material since any one of the coils directed towards the material may be used as edge measuring coil. This, in turn, means that the two coils positioned immediately inside become height measuring coils.

An edge measuring device according to the invention, as opposed to edge measuring devices operating with video technique, is practically independent of the surrounding environment. By the compensation technique described above, the distance dependence between edge measuring coils and rolled material, exhibited by previously known inductive edge position sensors, has been largely eliminated. In addition to these advantages, the influence of edge bending of the material, the thickness of the material and other material properties have also been considerably reduced.

DESCRIPTION OF THE PREFERRED EMBODIMENTS

Figure 1:
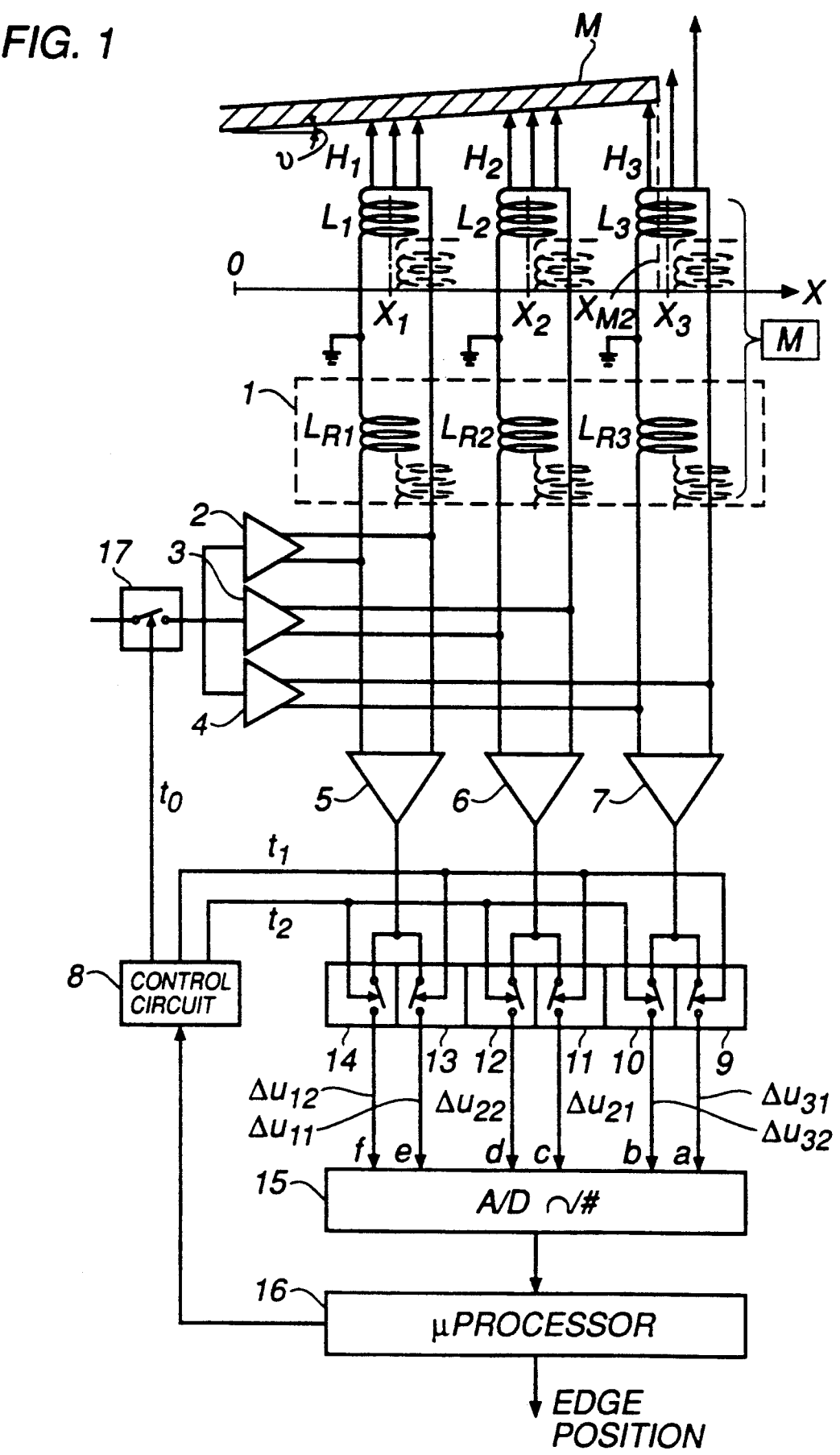
FIG. 1 shows a diagram of the principle of an edge measuring unit, that is, that part of an edge position measuring device which determines one of the edge positions of the material.

FIG. 1 shows a diagram of the principle of one of two identical edge measuring units included in an edge position measuring device according to the invention. To clarify the problem which arises when the rolled material M is bent at the edges, the material is shown forming a certain angle v with a plane parallel to the common plane for the field generating and measuring coils $L_1$, $L_2$ and $L_3$. The coils $L_1$ and $L_2$ correspond to the previously mentioned height measuring coils and $L_3$ is the edge measuring coil. To the extent that this is necessary, the coil $L_2$ will be referred to hereinafter as a first height measuring coil and the coil $L_1$ as a second height measuring coil. The axes of the coils are positioned at a distance $x_1$, $x_2$ and $x_3$ from a conceived initial position which, for example, may be the centre of adjacent rolls. The edge position of the rolled material is designated $x_{M2}$ in FIG. 1. The magnetizing fields generated are indicated by the symbols $H_1$, $H_2$ and $H_3$. As will also be clear, the field $H_3$, generated by the edge measuring coil $L_3$, will have a different configuration from the other coils. The reference coils $L_{R1}$, $L_{R2}$ and $L_{R3}$ are connected in parallel with these coils. The latter coils are placed so as not to be significantly influenced by the rolled material They may, for example, be enclosed in a shielded space 1.

As mentioned above, the coils $L_1$, $L_2$ and $L_3$ are used both to create the magnetizing field and to measure the voltage induced in the coil in case of decaying magnetic field. To be able to achieve this, the various occurrences must be separated in time, that is, a measuring cycle must be divided into a number of time intervals. In a preferred embodiment the magnetization takes place during a time interval which will hereinafter be referred to as $t_0$ and the sampled measurement of the induced voltages will take place during time intervals designated $t_1$ and $t_2$. The time interval $t_1$ comes immediately after the magnetizing current has been disconnected. The difference signal, obtained during time interval $t_1$, for the edge measuring coil and the corresponding reference coil is for the most part dependent on how large a part of the coil is covered by the material For the height measuring coils, the difference voltage measured during $t_1$ corresponds substantially to a measure of the distance between coils and material The time interval $t_2$ usually falls immediately after the cessation of the time interval $t_1$. The difference voltage measured during $t_2$ forms the basis for determining the above-mentioned material dependence. The mutual placement, the relative duration and the magnitude of the time intervals will be described in greater detail with reference to FIG. 2.

The current supply for magnetization is obtained according to FIG. 1 during the time $t_0$ from drivers 2, 3 and 4. In a preferred embodiment this takes place with a pulsed current for each one of the parallel-connected coil sets $L_1$ and $L_{R1}$, $L_2$ and $L_{R2}$ as well as $L_3$ and $L_{R3}$.

The voltages induced in each coil set, that is, the voltages from both the measuring coil and the reference coil, are supplied to the inputs of a differential amplifier 5, 6 and 7 for each coil set. The difference signals are supplied to sampling measuring circuits, the time intervals $t_1$ and $t_2$ of which are controlled in the same way as the time interval to by a control circuit 8. The sampling measuring circuits 9 and 10 belong to the edge measuring coil and the associated reference coil, and during the time interval $t_1$ the measuring circuit 9 measures the difference voltage $a = \Delta u_{31}$, and during the time interval $t_2$ the measuring circuit 10 measures the difference voltage $b = \Delta u_{32}$. The measuring circuits 11 and 12 belong to the first height measuring coil with the respective reference coil, and during the time interval $t_1$ the measuring circuit 11 measures the difference voltage $c = \Delta u_{21}$, and during the time interval $t_2$ the measuring circuit 12 measures the difference voltage $d = \Delta u_{22}$. In a corresponding way, the measuring circuits 13 and 14 belong to the other height measuring coil and the respective reference coil, and during the time interval $t_1$ the measuring circuit 13 measures the difference voltage $e = \Delta u_{11}$ and during the time interval $t_2$ the measuring circuit 14 measures the difference voltage $f = \Delta u_{12}$.

The analog sampled measured values from the measuring circuits are supplied to an analog-to-digital convertor 15. The digitized values are then supplied to a microprocessor 16 which processes and puts together the measured values obtained such that the data of the edge measuring coil and the associated reference coil can be compensated for distance dependence between edge measuring coil and material, for material dependence as well as for any edge bending of the material. In addition, the microprocessor is adapted to provide the control circuit 8 with control data for cycle frequency and sampling data. The control circuit also controls time interval $t_0$ by controlling the sampling circuit 17 for connection of magnetizing current into the coils.

Figure 2:
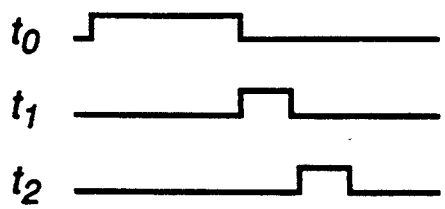
FIG. 2 shows the relative positions of the time intervals.

FIG. 2 shows the mutual relationships between the different time intervals. The necessary length of the time interval $t_0$ is to a certain extent dependent on the properties and thickness of the rolled metallic material. In a preferred embodiment, a suitable value may be of the order of magnitude of 20 $\mu$s. The length of the time interval $t_1$ shall correspond to the decay time for the inductive energy which is stored in the air around the coil. The decay time is determined by the properties of the coil, as, for example, number of turns and size of the coil, and may to a certain extent be chosen arbitrarily. To limit the influence on the material, a short decay time is favourable. On the other hand, too short times deteriorate the accuracy of measurement and the signal/noise ratio in the measuring electronics. In a preferred embodiment, $t_1$ has been chosen to be 0.7 $\mu$s. The time $t_2$ should not be considerably longer than $t_1$ and may suitably be chosen to be as long as $t_1$. To prevent crosstalk when switching the time intervals on and off, an interval between $t_1$ and $t_2$ of a few hundredths $\mu$s may be suitable. The pulse frequency is suitably chosen within the range 5-20 kHz, that is, such that a measuring sequence starts with an interval of between 50 and 200 $\mu$s.

Figure 3:
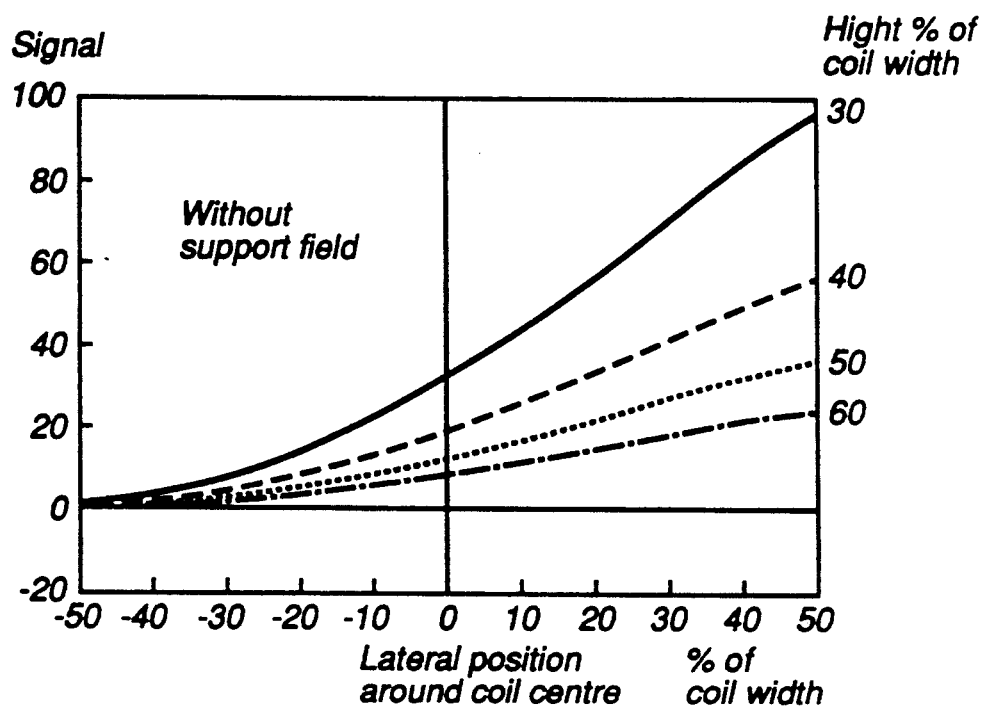
FIG. 3 shows the measured signal varies as a function of the degree of coverage of the edge measuring coil and the distance between the coil and the material.
Figure 4:
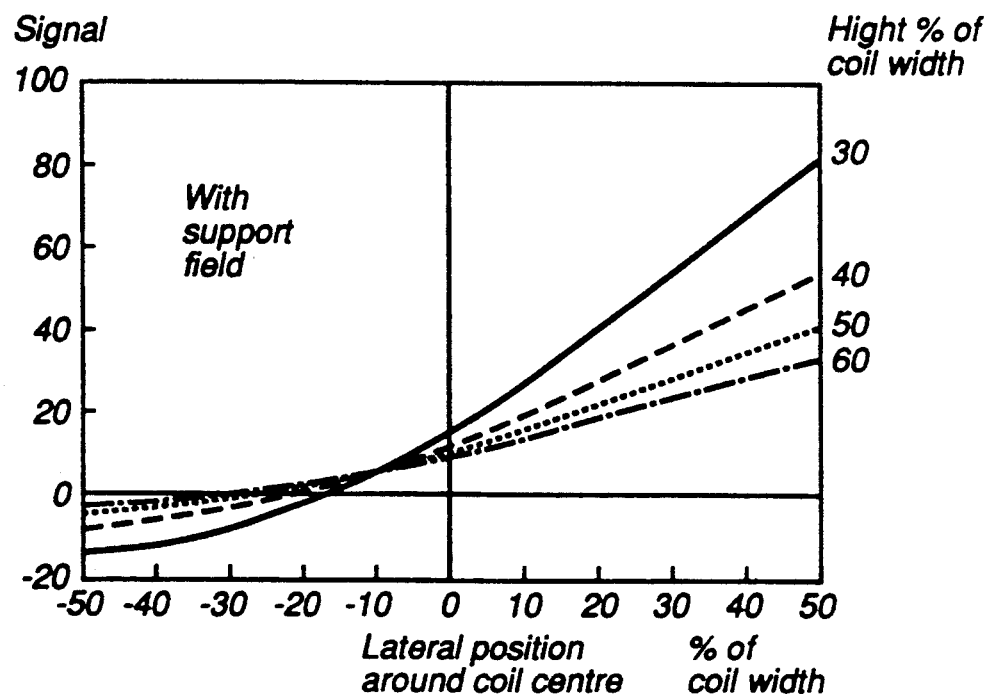
FIG. 4 shows how the measured signal varies as a function of the degree of coverage opf the edge measuring coil and the distance between the coil and the material with supply by means of a supporting field from the nearest height measuring coil.

FIGS. 3 and 4 show how the measured signal from the edge measuring coil varies as a function of the lateral position and the distance between the coil and the material without and with a supporting field from the nearest height measuring coil. For the edge measuring coil, a great lateral dependence is aimed at, which is equal to a great inclination of the curves. At the same time, the distance dependence shall be small, which means that the distance between the different height curves shall be small.

With supply from a supporting field, a part of the field from the height measuring coil will be forced by the material down through the edge measuring coil with a field direction which is directed opposite to the field of the edge measuring coil itself. In that way, as is shown in FIG. 4, supply from the supporting field in case of a small coverage of the edge measuring coil provides a measured signal with reversed polarity.

For a certain edge position, the height-dependent effect from supporting fields and edge measuring coil will be equally great. A position is obtained where the different height curves converge at practically one point. For this edge position the height dependence has been largely eliminated. In case of a greater coverage of the edge measuring coil, the field of the edge measuring coil itself predominates and the height curves again diverge.

One embodiment of the invention comprises a position control system as in FIG. 1 for lateral displacement of the coils such that the edge of the strip relative to the edge measuring coil will be positioned in the lateral position which corresponds to the point of intersection of the height curves.

Another embodiment of the invention which allows a considerable reduction of the heigh dependence comprises two overlapping coil rows the second one indicated by dotted lines in FIG. 1, which preferably have a lateral overlap of 50%, that is, are displaced in the lateral direction of the strip such that centre of the coils of one coil row lies above the space between the coils of the other coil row. To reduce the capacitive coupling between the coil rows, they are also somewhat displaced in relation to each other in the longitudinal direction of the strip.

If an edge position corresponds to the point of intersection of the height curves for one coil row, the edge position for the other coil row will indicate a need of height compensation. However, by a special weighting process, which will be described below, only the signal from that coil row where no height compensation is needed will be utilized for the further evaluation.

If a current edge position for both coil rows is positioned largely equidistantly from and on respective sides of the point of intersection of the height curves, the difference between the signals and the conceived signal at the point of intersection of the height curves will be practically equally great and oppositely directed. By connecting the signals in opposition, the resultant need of height compensation will be considerably reduced.

Generally, the edge position will be positioned between the above-mentioned extremes. In a region near the centre of a coil the height curves are well collected, and consequently the height dependence is small. The coil signal which originates from that coil row whose centre lies near the edge of the strip, will then have the weight "1" and coil signals from the other coil row will have the weight "0". For lateral positions outside the central region, the weighting is reduced for that coil row whose centre lies nearest the central region whereas the weighting for the other coil row to a corresponding extent increases its weighting from "0" to "1". The weighting function is otherwise formed such that the resultant height dependence is largely equal to zero.

For further improvement of the height compensation, several overlapping coil rows may be used. With the aid of the control system of the edge measuring unit, the coil pairs for each measurement may be switched in. In a preferred embodiment, simultaneous pulsing of the coil pairs for the respective coil row is performed.

The edge measuring unit may suitably comprise relatively many coils to be able to cover as large a width range as possible.

In the normal embodiment, the edge measuring unit is mounted in a fixed position in relation to the rolling mill. In an alternative embodiment, as described above, the edge measuring unit may be designed with a traversing facility with the aid of the position control system.

In alternative embodiments the reference coils can be replaced by a common reference coil or be completely omitted.

In a preferred embodiment, as mentioned above, the current supply to the coils is synchronous. However, the edge measuring unit may be caused to function satisfactorily even if the current supply to the height and edge measuring coils, respectively, does not take place simultaneously.

Another embodiment which permits an additional possibility of reducing the distance dependence comprises varying the current through the coil which supplies the supporting field. In that way, the position of the point of intersection for the height curves may be displaced and in this way the distance dependence may be reduced to near zero for a greater part of edge measuring coil.

Figure 5:
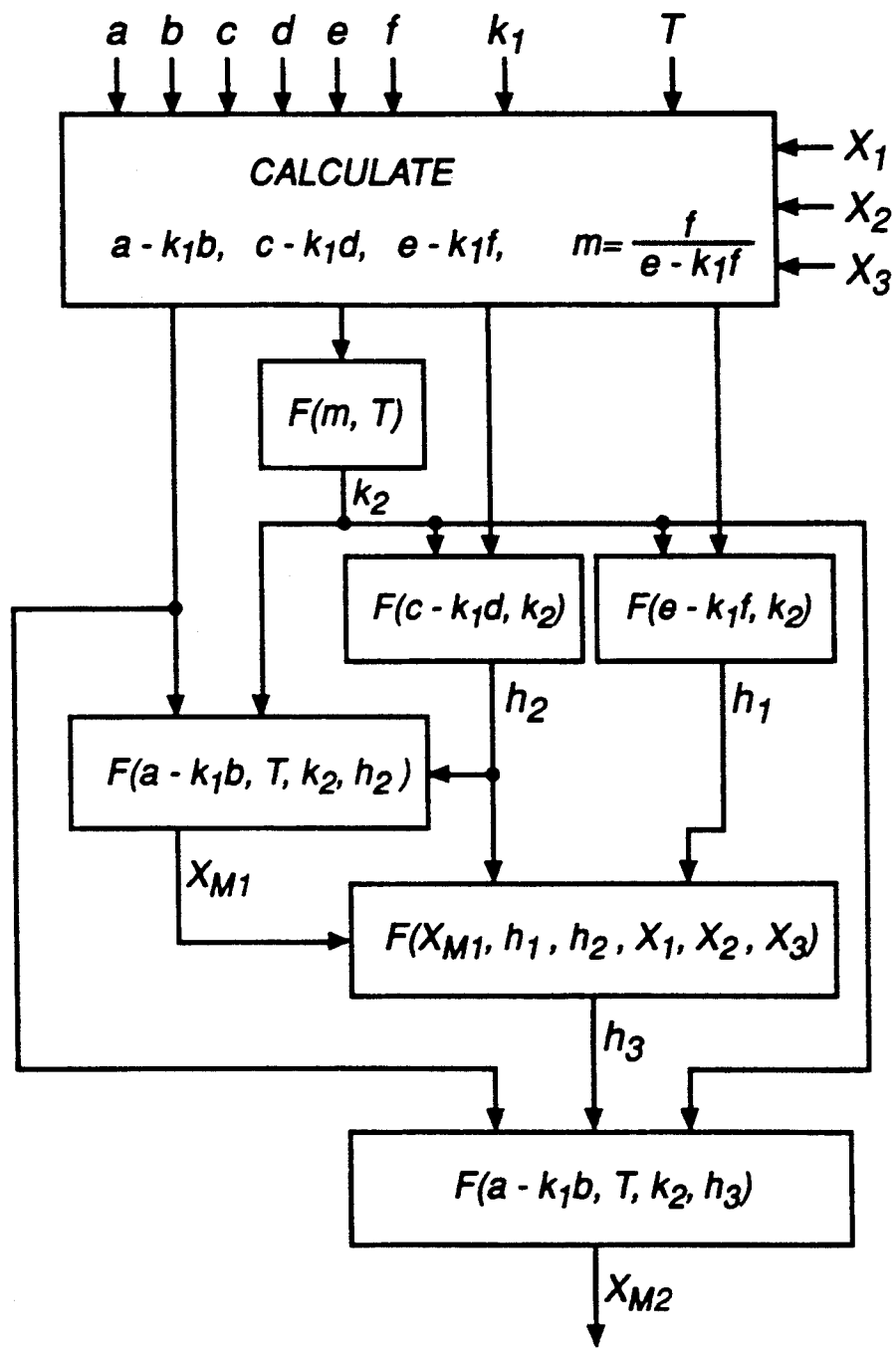
FIG. 5 shows a flow diagram for obtaining the edge position as broadly implemented in the microprocessor.

FIG. 5 shows a flow diagram for the internal processing sequence of the microprocessor. In addition to the difference voltages a . . . f, the microprocessor is supplied with a constant $k_1$ for the material in question for compensation of the material influence, information about the thickness T of the sheet, as well as the fixed x-coordinates of the coils.

The other quantities included in the flow diagram are clear from the following list:

$m = f/(e - k_1 f)$, a material quantity compensated for height $k_2 =$ a material and thickness-dependent constant $h_1 =$ the height of the material above the second height measuring coil $h_2 =$ the height of the material above the first height measuring coil $h_3 =$ the estimated height of the material above the edge measuring coil $x_{M1} =$ the estimated edge position, not taking into account the inclination of the material $x_{M2} =$ the calculated edge position.

A calculating sequence is started by determining the differences $a - k_1 b$, $c - k_1 d$ and $e - k_1 f$ and the quotient $m = f/(e - k_1 f)$. The next step is to determine $k_2$ for the current material and thickness in accordance with $$k_2 = F(m, T)$$

which relationship may be empirically determined for current materials and thicknesses. The relationship may, for example, be stored in the microprocessor in the form of tables or as multitudes of curves.

The calculating sequence then continues by determining the heights $h_1$ and $h_2$, which in turn are functions of $e - k_1 f$ and $c - k_1 d$ and the constant $k_2$, respectively, that is, $$h_1 = F(e - k_1 f, k_2)$$

$$h_2 = F(c - k_1 d, k_2)$$

Also these empirical relationships for the current materials and thicknesses are suitably implemented in the microcomputer in the form of tables or multitudes of curves.

Now, a roughly estimated value $x_{M1}$ of the x-coordinate of the edge position may be obtained. The parameters which determine the functional relationship for this value are clear from the following:

$$x_{M1} = F(a - k_1 b, T, k_2, h_2)$$

In the same way as above, a parameter dependence may be implemented in the microcomputer in the form of tables or curves.

If it is of interest to obtain a more accurate value of the edge position, a more exact value of the height of the material above the edge measuring coil must first be determined on the basis of available data. This can be performed starting from the following functional relationship:

$$h_3 = F(x_{M1}, h_1, h_2, x_1, x_2, x_3)$$

With the aid of $h_3$, which is determined in the same way as above with implemented tables or curves, and the parameters $k_2$, T and the difference voltage $a - k_1 b$, an accurate value of the coordinate $x_{M2}$ of the edge position can be determined in accordance with the empirical functional relationship $$x_{M2} = F(a - k_1 b, T, k_2, h_3)$$

We claim:

1. A method for edge position determination of metallic materials, wherein the region around the material edge is subjected to a pulsed magnetizing field from an edge measuring coil wound and directed such that the magnetic field lines emanating from the center of the edge measuring coil are directed substantially perpendicular to the material, the edge measuring coil is located at a certain distance from the material, and the edge measuring coil is partially overlapped by the material, wherein, inside the edge measuring coil, in the transverse direction of the material, there is placed in the same plane relative to the material as the edge measuring coil, at least one height measuring coil, whereby, with pulsed magnetization of the height measuring coil, magnetizing fields towards the material are obtained, and that the edge position determination is performed by evaluation of the voltage induced in the edge measuring coil and the height measuring coil(s) when the magnetizing fields from the edge measuring coil and the height measuring coil(s) decay, and that the induced voltage of the height measuring coils(s) is utilized for height compensation of the voltage induced in the edge measuring coil.

2. A method of edge position determination of metallic materials according to claim 1, wherein, immediately after the magnetizing fields have started decaying, the voltages induced in the edge measuring and height measuring coils are measured during a first time interval $t_1$ as well as during an immediately following second time interval $t_2$, that the induced voltage from the edge measuring coil measured during the first time interval represents a first uncompensated measure of the edge position and that the voltages(s) induced in the height measuring coil(s) during the first time interval $t_1$ represent(s) a first uncompensated measure of the distance of the material from the height measuring coil(s), that the voltages in the edge and height measuring coils induced during the second time interval $t_2$ are used for material dependence correction of the first uncompensated measures of edge position and distance between height measuring coils and the material, and that the measure of the edge position, compensated for the material, is compensated for the distance dependence, induced in the edge measuring coil, between the edge measuring coil and the material with the aid of the distance between measuring coils and material determined by means of the height measuring coil(s), which for a number of measured compensated induced voltages, the real edge position for the respective measured value is indicated.

3. A method for edge position determination of metallic materials according to claim 1, wherein both the edge measuring and height measuring coils are designed with the same both electrical data and dimensions.

4. A method for edge position determination of metallic materials according to claim 1, wherein two or more coil rows with edge and height measuring coils are arranged overlapping each other in the lateral direction.

5. A method for edge position determination of metallic materials according to claim 4, wherein each coil row may be moved in the lateral direction.

6. A method for edge position determination of metallic materials according to claim 1, wherein the edge measuring coil and the height measuring coil(s), with respect to the magnetization, are pulsed synchronously.

7. A method for edge position determination of metallic materials according to claim 1, wherein, if the distances which are indicated between the height measuring coils and the material when two or more height measuring coils are used are different because of edge bending of the material, a corrected value of the distance between the edge coil and the material is calculated with the aid of known values of the distance in the transverse direction of the material between the height measuring coils and the edge measuring coil, which corrected value is used for compensation of the distance dependence of the voltage induced in the edge coil during the first time interval $t_1$.

8. A method for edge position determination of metallic materials according to claim 1, wherein the voltages induced in the edge and height measuring coils are each connected in opposition to an induced voltage from a respective reference coil with the same electrical data and dimensions as the edge and height measuring coils and which are positioned such that they are not significantly influenced by the material.

9. A method for edge position determination of metallic materials according to claim 8, wherein the edge and height measuring coils are positioned in a shielded space such that they are not significantly influenced by the material.

10. A method for edge position determination of metallic materials according to claims 1, wherein the magnetizing fields are produced by conducting an equal amount of current through the edge and the height measuring coils and the respective reference coils which are connected in opposition, that the voltages induced in the coils are supplied to differential amplifiers for measurement of the difference voltages between the edge and height measuring coils and the respective reference coils, that the difference voltages are continuously sampled and that the value during the first time interval $t_1$ immediately after the magnetizing field has started to decay is determined, and that the value of the difference voltages during the second immediately following time interval $t_2$ is determined, that the sampled measured values are supplied to an analog-to-digital convertor, whereby "a" indicates the value of the sampled measured signal during $t_1$ for the edge measuring coil and the associated reference coil, and "b" indicates the value of the sampled measured signal for the same coils during the time interval $t_2$, that "c" indicates the value of the sampled measured signal during the time interval $t_1$ for the first height measuring coil and the associated reference coil, and "d" indicates the value of the sampled measured signal for the same coils during the time interval $t_2$, that "e" indicates the value of the sampled measured signal during the time interval $t_1$ for the second heigh measuring coil and the associated reference coil, and that "f" indicates the value of the sampled measured signal for the same coils during the time interval $t_2$, which values are then supplied to a microprocessor together with known values of the thickness T of the material, a constant $k_1$ for the current material for compensation of the influence on the material as well as a lateral coordinates for the second and first height measuring coils and the centre of the edge measuring coil, and that a number of determinations are carried out in the microprocessor based on these supplied values and on implemented functional relationships in the form of tables and a number of curves for the current material, which determinations take place in the following order: determination of $a-k_1b$, $c-k_1d$, $e-k_1f$ and a height-compensated material quantity $m=f/(e-k_1f)$; determination of $k_2=F(m,T)$ as a material and thickness-dependent constant; determination of $h_2=F(c-k_1d,k_2)$ as the height of the material above the first height measuring coil; determination of $h_1=F(e-k_1f,k_2)$ as the height of the material above the second height measuring coil; determination of $x_{M1}=F(a-k_1b,T,k_2,h_1)$ as a roughly estimated edge position not taking into account the inclination of the material; determination of $h_3 = F(x_{M1}, h_1, h_2, x_1, x_2, x_3)$ as the estimated height of the material above the edge measuring coil, and determination of $x_{M2} = F(a - k_1 b, T, k_2, h_3)$ as the edge position.

11. An edge position measuring device for carrying out edge position determination of metallic materials and which comprises an edge measuring coil which is located at each end of the material and which is wound and directed such that the magnetic field lines, emanating from the center of the edge measuring coil, in the magnetizing field are directed perpendicular to the material, the edge measuring coil being located at a certain distance from the material and the edge measuring coil being partially overlapped by the material, wherein, inside the edge measuring coil in the transverse direction of the material there is arranged, in the same plane relative to the material as the edge measuring coil, at least on height measuring coil which generates corresponding magnetizing fields directed towards the material, that the edge position measuring device comprises sampled measuring circuits for measurement of the voltage(s) induced in the edge and high measuring coil(s) during a first and a second time interval immediately after the magnetizing fields have started decaying, and an A/D convertor for conversion of the sampled analog measured values into corresponding digital values, which values form the basis of a u-processor which, with preprogrammed empirical data for the current materials is adapted to provide a measure of the edge position.

12. An edge position measuring device according to claim 11 for edge position determination of metallic materials, wherein both the edge and height measuring coils are arranged with the same electrical data and dimensions.

13. An edge position measuring device according to claim 11 for edge position determination of metallic materials, wherein two or more rows of coils with edge and height measuring coils are arranged to overlap each other in the lateral direction.

14. An edge position measuring device according to claim 11 for edge position determination of metallic materials, wherein each coil row is arranged movable in the lateral direction.

15. An edge position measuring device according to claim 11 for edge position determination of metallic materials, wherein the edge position measuring device comprises a reference coil with the same electrical data and dimensions as the edge and height measuring coil(s) and that the reference coil is arranged in a shielded space such that it is not significantly influenced by the material and connected such that the voltage induced in the reference coil in case of a decaying magnetic field is connected in opposition to the voltage induced in the edge and height measuring coils.

16. An edge position measuring device according to claim 11 for edge position determination of metallic materials, wherein the edge position measuring device comprises a reference coil for both the edge and the height measuring coils and that the reference coils are arranged with the same electrical data and dimensions as the edge and height measuring coils and that they are connected in opposition such that the voltages induced in the reference coils are connected in opposition to the voltages induced in the edge and height measuring coils.

17. An edge position measuring device according to claim 16 for edge position determination of metallic materials, wherein the voltages from the oppositely connected edge measuring and the respective reference coils and that the voltages from the height measuring and the respective reference coils are each connected to the inputs of a respective differential amplifier, the outputs of which are connected to the sampled measuring circuits.

* * * * *